UNITED STATES PATENT OFFICE.

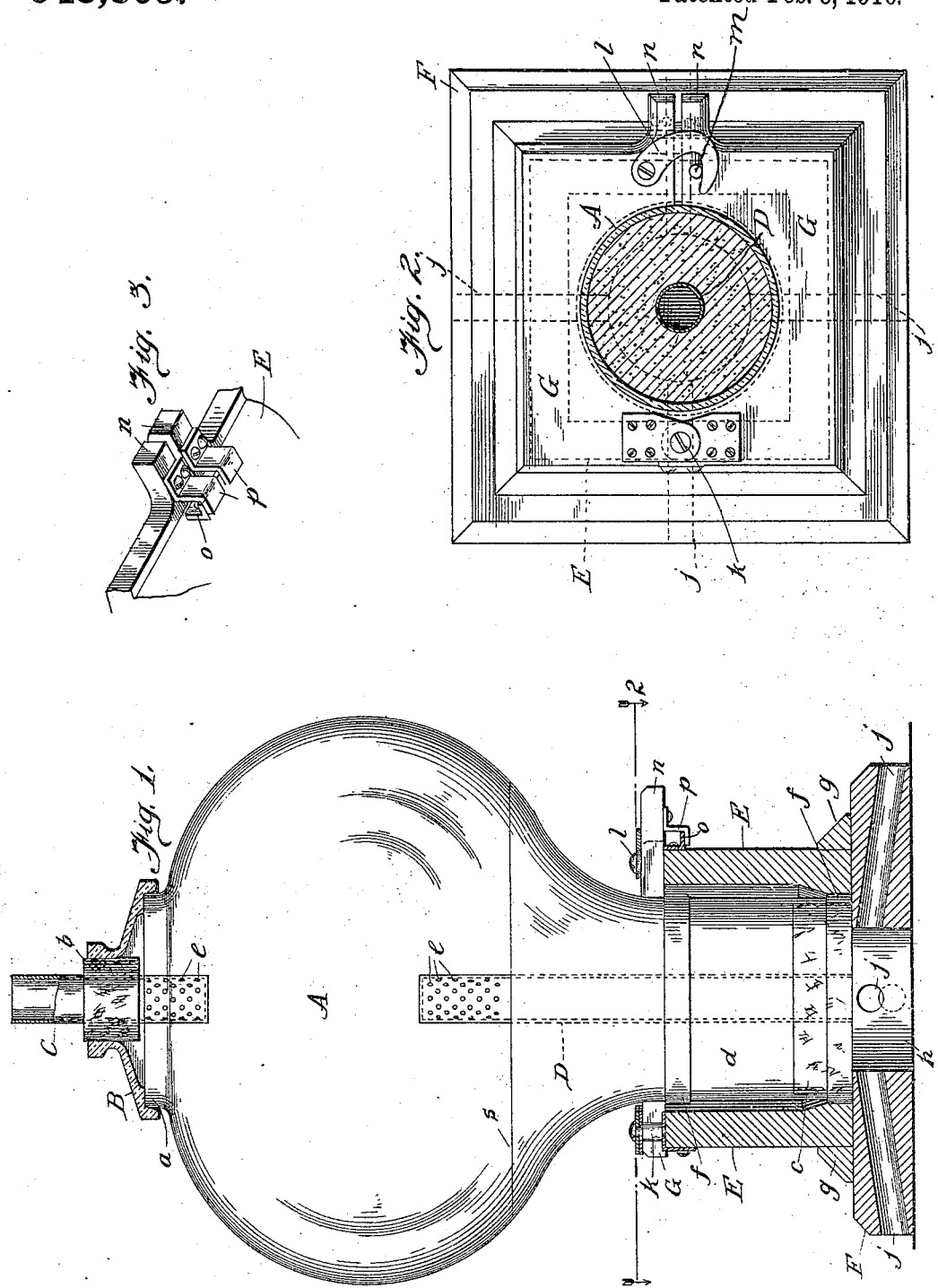

GUSTAF A. AKERLIND, OF CHICAGO, ILLINOIS.

INSECTARIUM.

948,805.

Specification of Letters Patent.

Patented Feb. 8, 1910.

Application filed May 14, 1908. Serial No. 432,788.

*To all whom it may concern:*

Be it known that I, GUSTAF A. AKERLIND, a citizen of the United States, and resident of Chicago, in the county of Cook and State of Illinois, have invented a certain new and useful Improvement in Insectariums, of which the following is a description.

My invention relates to an improvement in insectariums; the object being to provide means whereby insects and the like may be confined under conditions that will permit of life and development; the receptacle or device being so constructed as to permit of the study of entomology, as will be readily apparent from the detailed description hereinafter set forth and from the drawing forming a part of this specification, in which I have illustrated what I believe to be the simplest and most convenient construction.

In the drawings:—Figure 1 is a side elevation, with the lower portion of the device shown in vertical section. Fig. 2 is a horizontal sectional view taken on line 2—2 of Fig. 1. Fig. 3, is an inverted perspective of a portion of the upper edge of the standard, illustrating the means of securing the free ends of the cover to the standard.

Like letters of reference indicate identical parts in the different figures.

In order that the development of the insects during their confinement may be seen and noted from time to time, I provide the transparent or glass globe or receptacle A. This globe is shown provided with diametrically opposite openings, one at the top and the other at the bottom; which, during use of the apparatus, are sealed or closed against the passage of any insects; the upper opening being closed by the cap or lid B, which is adapted to seat itself on and take about the collar a, on the globe A. The cap B, is provided with a central opening in which is placed a cork-stopper b, whereby a tight joint can readily be obtained. This cork b, also permits of the insertion therethrough of conduit or ventilating-tube C, whereby air is permitted to circulate. By employing a substance like cork, the conduit C, is firmly held in position without the necessity for further fastening. The lower opening in the globe A, is also provided with a cork-stopper c. This stopper c, is preferably inserted completely within the neck-portion d, of receptacle A, as shown, so that a flat surface may be had on the bottom. Inserted similarly through stopper c, is a conduit or tube D. These conduits C and D may be of any suitable material, such as pieces of bamboo, the core of which has of course been removed so as to leave a free and unobstructed passage-way therethrough. The outer ends of these conduits are left open, while the inner ends are sealed so as not to permit insects or other matter to enter into the conduits from within or pass into the receptacle A. The inner ends of these conduits C, D, are provided preferably with a sufficient number of perforations of minute size as at e, whereby air is permitted to pass to the interior of globe A. I however believe the construction illustrated is the preferable form.

The cap or lid B, is preferably of glass with a smooth ground face near the rim to fit the ground surface of the flange or collar portion a, of receptacle A, to insure a tight joint. Of course, any other suitable material that would provide a tight joint may be employed.

As the globe or receptacle A, is provided with a certain quantity of sand, earth or other proper substance, conduit D, is made of sufficient length to extend above the level of the sand or other substance indicated by line s; but, except for length, this conduit D is identical with conduit C.

I prefer to provide the lower part of the globe or receptacle A, with the extension or neck portion d, as before described. This neck-portion d, is preferably provided with one or more flanges or enlarged portions as at f, f, so that the globe may be securely held in the standard or base-portion, as will hereinafter be set forth. By providing the neck-portion d, to vessel or globe A, space for the sand or earth is provided and means for supporting or holding the globe in an upright position is had.

Surrounding the lower or neck-portion d, of globe or receptacle A, is a base or standard preferably of wood, comprising vertical side pieces E, suitably secured on a base or bottom piece F. For the sake of finish and at the same time to reinforce the bottom of the sides E, the beveled strips g, may be employed. The bottom piece F, is provided with a central opening or chamber h, which comes immediately beneath the orifice of tube D; communicating with this chamber h, are channels j, which I have preferably shown running up at an incline from the base-exterior and also from the four sides of the base; though of course, any number of them may be employed. These channels $j$, it will be seen permit a free circulation of air through the receptacle by reason of conduits or tubes C and D. The channels $j$, are preferably made at an incline leading into close proximity to the orifice of conduit D, but it will be readily understood that the construction may be varied.

Hinged or pivoted at $k$, by any suitable construction of hinge, on top of the side E of the base or standard, is a two-part top or cover G; each part being cut out sufficiently to permit it to take about the neck-portion $d$ just above flange $f$, (see Fig. 1). The hinge or pivot $k$, permits each part of top G to be swung out in a horizontal direction, as will be readily understood. Any of the well known constructions of hinges that permit of such movement, may be employed, and a detailed description of the hinge is therefore not necessary. It is apparent that when the sections of the top or cover G are brought together about the neck $d$ and locked together, as for example, by hook $l$, which is fastened to one section of the top and takes about the pin or peg $m$, it will be impossible to withdraw the globe or receptacle A from the base or standard. In order that the sections of the top G may be readily operated, I prefer to provide them with the extensions $n$, $n$. To securely hold the free ends of the cover that are not pivoted, to the base, I provide the simple means illustrated, which consists of an angular piece of metal $o$, secured against the vertical side E, while the under-side of each extension $n$, of the sectional cover or lid G, is also provided with an angular strip $p$, which is adapted to take beneath the one side of angular piece $o$, as can clearly be seen in Figs. 1 and 3. This will securely hold the unhinged side of the top or cover to the body-portion of the base.

In use, the receptacle or globe A may be partly filled with sand or dirt as indicated, and the globe A secured in place in the standard or base, after conduit D has been inserted into place. The two portions or sections of the lid or cover G are then brought together about the neck of the receptacle and the cover G locked in place. The insects may then be inserted through the top opening into the receptacle, after which the cap B with its stopper and conduit or tube is put in place, thus securely housing the insects and at the same time permitting of a free circulation of air.

With the use of my improved construction, it will be seen that injury to the housed insects from any outside source is impossible, as contact with the insects is impossible after the device has been closed.

I have illustrated and described the channels $j$, in the bottom or base of the standard as inclining upward toward the chamber in the center of the standard, as that will insure a more ready flow of air up into the interior of the receptacle; the conduit C, of course permitting the air to flow and pass out through it.

I have described what I believe to be the simplest and best construction, but it is apparent that a number of alterations may be made without departing from the spirit of my invention, and I do not wish to be understood as limiting myself to the exact construction shown and described, but

What I claim as my invention and wish to secure by Letters Patent, is:—

1. A device of the character described, comprising a receptacle provided with openings, means whereby said openings are closed against ingress or egress of insects and the like and extending into the receptacle to permit of a free circulation of air through said receptacle.

2. A device of the character described, comprising a receptacle provided with openings to permit of access to the interior, means whereby said openings are sealed against passage therethrough, and conduits taking into said receptacle and provided with air passages, the inner ends of said conduits being sealed against the passage of insects and the like.

3. An insectarium, comprising a receptacle provided with openings at opposite sides, conduits taking through said openings and into the receptacle whereby air is conveyed to the receptacle-interior, means taking into the openings in the receptacle and surrounding the conduits whereby the latter are held in position, and a base taking about a portion of said receptacle to maintain it in proper position.

4. An insectarium comprising a transparent receptacle, means extending into the receptacle and provided with passages therethrough whereby air is permitted to circulate through the receptacle, said passages being so formed as to prevent the passage of insects therethrough or communication with the insects.

5. A device of the character described, comprising a transparent receptacle provided with a neck-portion, said receptacle having openings whereby access to the interior may be had, conduits adapted to extend into the receptacle and formed to prevent the passage of insects and the like but permit of the flow of air into said receptacle, a frame having a chamber to receive the neck-portion of said receptacle, channels in said frame and terminating in proximity to one of said conduits whereby air is permitted to flow into the receptacle, and means taking about said receptacle whereby it is locked in said frame.

6. A device of the character described comprising a transparent receptacle having diametrically opposite openings, said receptacle being provided with an extension in which one of said openings is located, means taking through said openings and into the receptacle whereby air is permitted to circulate through the receptacle but the passage of insects therethrough prevented, and mechanism adapted to receive the extended portion of the receptacle, said mechanism providing a chamber adjacent the opening in said extended portion and having communication with the exterior and with the means taking through said opening.

7. In a device of the character described, a transparent receptacle having openings to permit of access to the receptacle-interior, conduits adapted to extend into the receptacle and provided with minute openings for the passage of air and the like; the inner ends of said conduits being sealed against the passage of solids, means taking into the receptacle-openings, whereby the openings are sealed and the conduits retained in place, and means whereby the receptacle is held in position.

8. An insectarium, comprising a receptacle having openings, a conduit entering each opening and formed to permit the flow of air into the receptacle but prevent the passage of insects, means taking into the openings in the receptacle and about the conduits whereby the latter are held in position, and a base adapted to take about the receptacle and provided with channels terminating in proximity to the orifice of one of said conduits.

GUSTAF A. AKERLIND.

Witnesses:
PAUL SCHMECHEL,
NORMAN A. STREET.